US007853038B2

(12) United States Patent
Lee

(10) Patent No.: US 7,853,038 B2
(45) Date of Patent: Dec. 14, 2010

(54) SYSTEMS AND METHODS FOR OBJECT DIMENSION ESTIMATION

(75) Inventor: Kual-Zheng Lee, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 1015 days.

(21) Appl. No.: 11/649,940

(22) Filed: Jan. 4, 2007

(65) Prior Publication Data

US 2008/0166019 A1  Jul. 10, 2008

(51) Int. Cl.
*G06K 9/00* (2006.01)
(52) U.S. Cl. ........................ 382/100; 382/106
(58) Field of Classification Search ............... None
See application file for complete search history.

(56) References Cited

U.S. PATENT DOCUMENTS

| | | | | |
|---|---|---|---|---|
| 5,153,721 | A * | 10/1992 | Eino et al. | 382/152 |
| 5,995,649 | A * | 11/1999 | Marugame | 382/154 |
| 6,317,991 | B1 * | 11/2001 | Rinn | 33/1 M |
| 6,611,344 | B1 * | 8/2003 | Chuang et al. | 356/601 |
| 6,987,535 | B1 * | 1/2006 | Matsugu et al. | 348/239 |
| 7,376,284 | B2 * | 5/2008 | Tao et al. | 382/285 |
| 2003/0194131 | A1 * | 10/2003 | Zhao et al. | 382/190 |
| 2004/0234106 | A1 * | 11/2004 | Luu et al. | 382/106 |
| 2005/0219554 | A1 * | 10/2005 | Tobiason et al. | 356/614 |
| 2008/0166019 | A1 * | 7/2008 | Lee | 382/106 |
| 2009/0080780 | A1 * | 3/2009 | Ikeda | 382/209 |

FOREIGN PATENT DOCUMENTS

JP    2008286638 A   * 11/2008

OTHER PUBLICATIONS

Criminisi et al, "Single View Metrology", Internation Journal of Computer Vision 40(2), pp. 123-148, 2000.*
David et al, "Creating Architectural Models from Images", Eurographics 1999, vol. 18 No. 3.*
Cootes et al, "The Use of Active Shape Models for Locating Structures in Medical Images", Image and Vision Computing, VOl 12, No. 6, Jul. 1994 pp. 355-366.*
Zezhi Chen, "A Method of Visual Metrology From Uncalibrated Images", Patter Recognition Letters 27, pp. 1447-1456, (May 26, 2005), Elsevier B.V.

(Continued)

*Primary Examiner*—Yubin Hung
*Assistant Examiner*—Avinash Yentrapati
(74) *Attorney, Agent, or Firm*—Alston & Bird LLP

(57) ABSTRACT

A system and a method of obtaining a dimension of a target object in an image comprises receiving coordinates of a number of feature points in the image, receiving coordinates of at least one reference object in the image with a known dimension, performing a calibration to adjust the coordinates of at least one of the feature points, and receiving coordinates of the target object in the image and determining the dimension of the target object based on the coordinates of the feature points. The coordinates of at least one of the feature points are adjusted to increase an accuracy in determining the dimension of the reference object.

21 Claims, 5 Drawing Sheets

OTHER PUBLICATIONS

Andres Almansa, "Vanishing Point Detection without Any a Priori Information", IEEE Transactions on Pattern Analysis and Machine Intelligence, vol. 25, No. 4, pp. 502-507, (Apr. 2003), IEEE Computer Society.

Alexander Bovyrin, "Human Hight Prediction and Roads Estimation for Advanced Video Surveillance Systems", pp. 219-223, (2005), IEEE.

A. Criminisi, "Single view Metrology", International Journal of Computer Vision 40(2), pp. 123-148, (2000), Kluwer Academic Publishers, Manufactured in TheNetherlands.

Guanghui Wang, "Single view metrology from scene contraints", Image and Vision Computing 23, pp. 831-840, (Jun. 2, 2003), Elsevier B.V.

\* cited by examiner

SYSTEMS AND METHODS FOR OBJECT DIMENSION ESTIMATION

BACKGROUND OF THE INVENTION

1. Field of the Invention

This invention relates to measurement systems and methods, and more particularly, to systems and methods for obtaining a dimension of an object in an image.

2. Background of the Invention

With technology development and increase on the needs for society security, surveillance systems become a popular research topic and may be used in various applications. Many surveillance systems require a number of video cameras placed in several locations, and the recorded video images may be transmitted through cables or network to storage medium. The recorded video images may be referred to later for further analysis if an accident or incident occurred in the monitored area. Because manual identification is usually relied on for recognition of video images, it is difficult for surveillance systems to provide advance and/or preventive warning. Therefore, development of automatic analysis by computing systems has attracted a lot of attention.

Using visual technique to obtain geometrical information has received wide applications in recent years. Examples of its application include architectural and indoor measurements, reconstruction of objects in paintings, forensic measurements and traffic accident investigation. As an example, the technique may be used to classify people on the scene by their heights as well as for consumer target analysis. One approach to obtaining object dimension is, for example, to place one or more rulers somewhere in the monitored scene so that object dimension may later be estimated with reference to the rulers. Another approach is using a computer to analyze the captured visual information to obtain object dimension offline, sometimes with more accuracy, flexibility and efficiency.

There are a number of computing techniques for measuring objects from an image. For example, Criminisi et al. proposed an approach to compute object measurement from a single perspective images. A. Criminisi and A. Zisserman, *Single view metrology*, International Conference on Computer Vision, Kekyrn, Greece, September 1999, pp. 434-442. It assumed that the vanishing line of a reference plane in the scene as well as a vanishing point in a reference direction may be determined from the image. Based on the vanishing line and point, distances between any plane which are parallel to the reference plane, area and length ratio on these planes and the camera's position may be computed.

Another approach is to use linear transformation between the camera and the 3D scene to obtain parameters which in turn may be used to compute object dimension. A. Bovyrin and K. Rodyushkin, *Human Height Prediction and Roads Estimation for Advanced Video Surveillance Systems*, IEEE 2005, pp. 219-223. Wang, et al. proposed to obtain a camera projection matrix first through the homography of a reference space plan and its vertical vanishing point, and then use the matrix and some available scene constraints to retrieve geometrical entities of the scene, such as object height and distance from a point to a line. G. Wang, Z. Hu, F. Wu, and H. Tsui, *Single View Metrology From Scene Constraints*, Image Vision Computing, Elsevier B.V. 2005. In another approach, object dimension is computed from the parameters obtained through the relationship between two uncalibrated images. Z. Chen, N. Pears, and B. Liang, *A Method of Visual Metrology From Uncalibrated Images*, Pattern Recognition Letters, Elsevier B.V. 2006.

BRIEF SUMMARY OF THE INVENTION

One example consistent with the invention provides a method of obtaining a dimension of a target object in an image. The method may include receiving coordinates of a number of feature points in the image, receiving coordinates of at least one reference object in the image with a known dimension, performing a calibration to adjust the coordinates of at least one of the feature points, and receiving coordinates of the target object in the image and determining the dimension of the target object based on the coordinates of the feature points. The coordinates of at least one of the feature points are adjusted to increase an accuracy in determining the dimension of the reference object In another example, a method of obtaining a dimension of a target object in an image is provided. The method may include receiving coordinates corresponding to a number of feature points in the image, determining coordinates corresponding to vanishing points based on the coordinates corresponding to the feature points, receiving coordinates corresponding to at least one reference object in the image with a known dimension, determining the dimension corresponding to the reference object based on the coordinates corresponding to the vanishing points, performing a calibration to adjust the coordinates corresponding to the feature points, and receiving coordinates of the target object in the image and determining the dimension of the target object based on the vanishing points. The coordinates corresponding to the feature points are adjusted to increase an accuracy in determining the dimension of the reference object Another example consistent with the invention provides a system for obtaining a dimension of a target object in an image. The system may include a first device capable of providing coordinates corresponding to a number of feature points in the image and providing coordinates corresponding to at least one reference object in the image, wherein a dimension of the reference object is known, and a calibration device for receiving the coordinates corresponding to the feature points and the coordinates corresponding the reference object and for adjusting the coordinates corresponding to the feature points. The coordinates corresponding to the feature points are adjusted to increase accuracy in determining the dimension of the reference object.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended, exemplary drawings. It should be understood, however, that the invention is not limited to the precise arrangements and instrumentalities shown.

In the drawings.

DETAILED DESCRIPTION OF THE INVENTION

Figure 1:
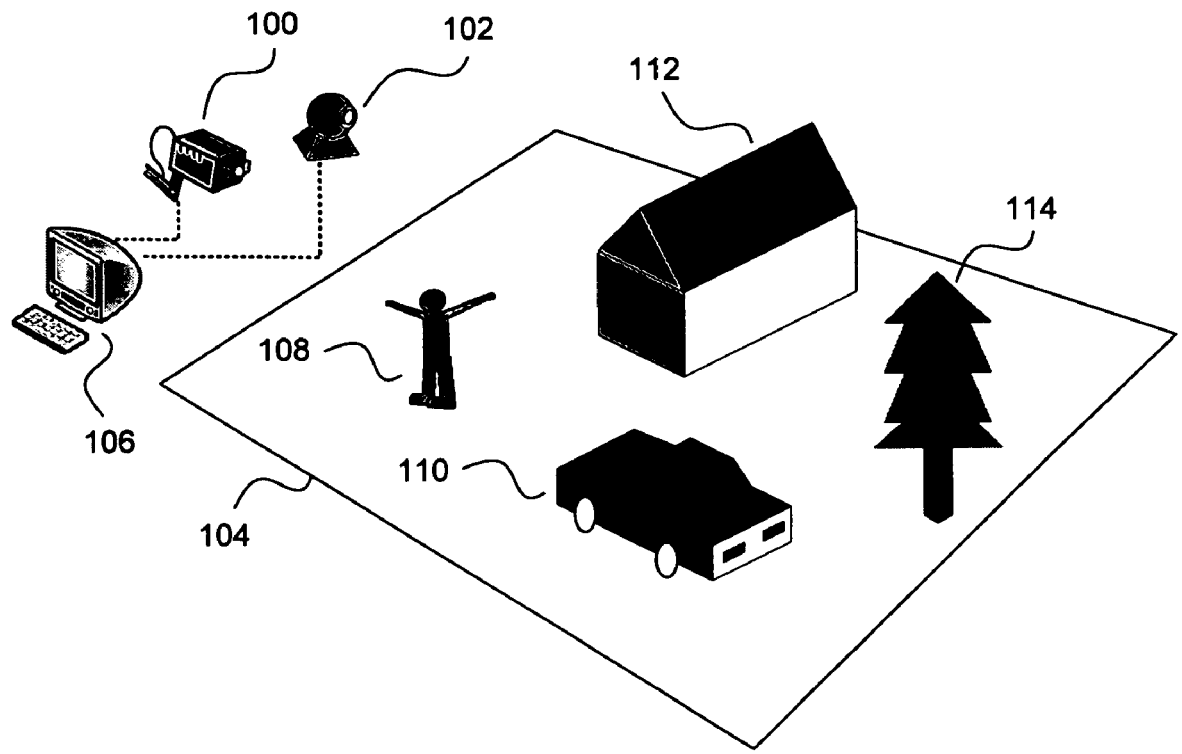
FIG. 1 is a diagram of an exemplary scene for illustrating one application consistent of the present invention.

FIG. 1 shows an exemplary example that the present invention may be implemented. With reference to FIG. 1, a monocular camera, such as an ordinary video CCD surveillance camera 100 and a digital video camera 102, may be used to capture images. The camera 100 or 102 is set up in a way so that a ground plane 104 is included in the captured scene. In addition, the camera 100 or 102 is connected to a computer 106 that incorporates the present invention therein. With the camera 100 or 102 set up appropriately, optimal space calibration discussed in detail below may be performed to obtain optimal parameters for object measurement. Based on the optimal parameters, any object in the image, for example, a person 108, a vehicle 110, a tree 114 and a house 112, may be estimated as long as the top and bottom coordinates of the object are provided.

Figure 2A:
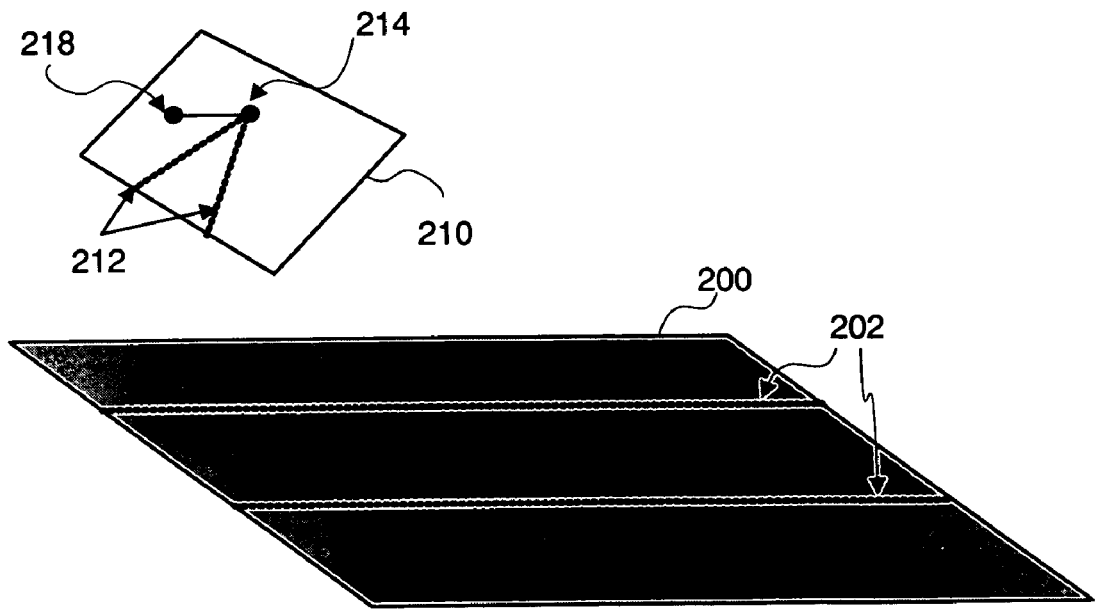
FIGS. 2A-2C are diagrams for illustrating certain principles of geometry.
Figure 2B:
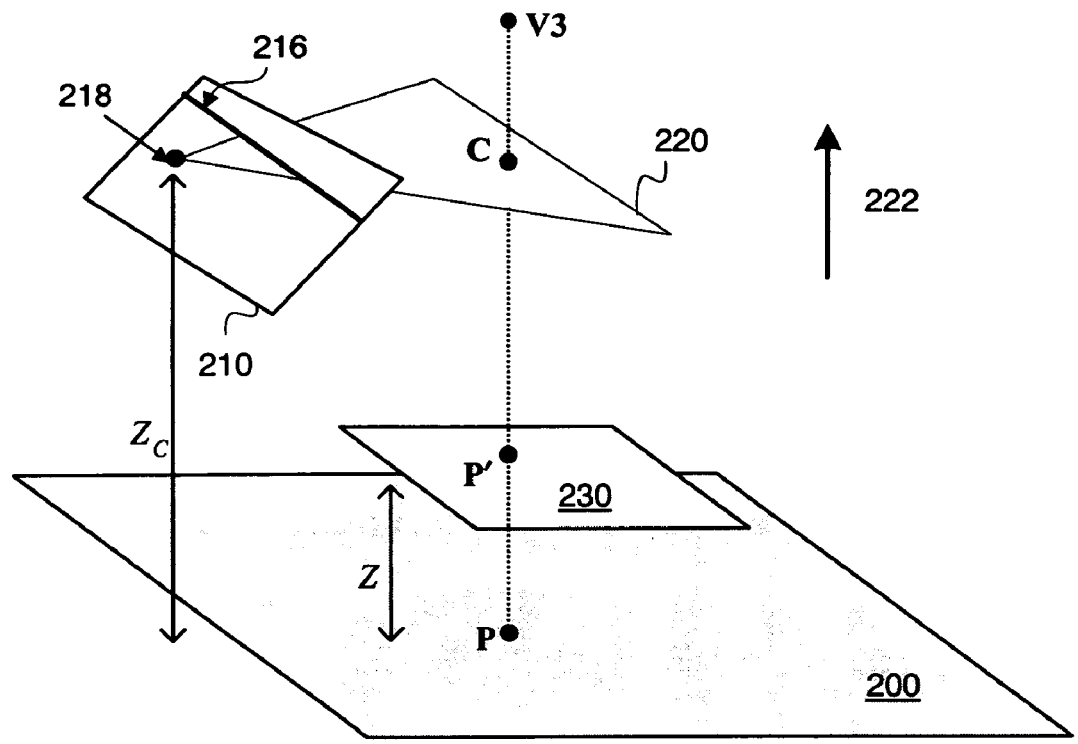
Figure 2C:
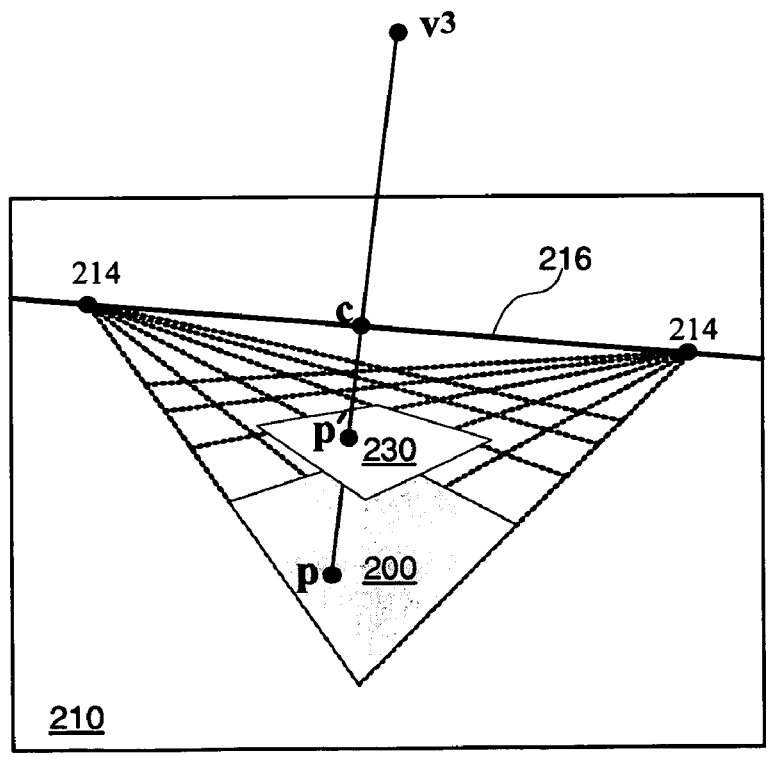

FIGS. 2A-2C illustrate certain principles of geometry regarding vanishing lines and vanishing points of a plane. Referring to FIG. 2A, a reference plane in 3D space is often, but not necessary, the ground plane 200. A set of parallel lines 202 on the ground plane 200 that are projected into a 2D image plane 210 becomes a set of concurrent lines 212. The meeting point of these lines in the image plane 210 is called a vanishing point 214. Connecting vanishing points 214 of all possible parallel lines on the ground plane 200 constitutes a vanishing line 216 as shown at FIG. 2B. The vanishing line 216 and the camera center 218 may constitute a plane 220 parallel to the ground plane 200.

FIG. 2B shows an object in the 3D space between two planes relative to the distance of the camera center 218 from the ground plane 200. Referring to FIG. 2B, assuming that an object in 3D space has a bottom coordinate P and a top coordinate P' with its height Z. The top and bottom coordinates are respectively on the ground plane 200 and a plane 230 parallel to the reference plane 200. A reference direction 222 is the vector of the planes 200 and 230 as shown at FIG. 2B. $V_3$ is a vanishing point at the direction parallel to the reference direction 222 as shown at FIG. 2B. C is an intersection point of the plane 220 and a line parallel to the reference direction 222. Since both the camera center 218 and the point C fall on the plane 220, the distance between the point C and the ground plane 200 is equal to the distance $Z_c$ of the camera center 218 from the ground plane 200. Corresponding to FIG. 2B, FIG. 2C shows an object on the image plane 210 between two planes relative to the distance of the camera center 218 from one of the two planes. Points 214 are the two vanishing points of the plane 200 and constitute a vanishing line 216. $v_3$ is a vanishing point at the direction perpendicular to the plane 200. c is the intersection point of the vanishing line 216 and the line perpendicular to the plane 200 and connecting to $v_3$. Upper case letters (P) are used to indicate quantities in 3D space and lower case letters (p) to indicate image quantities.

The four points p, p', C, $v_3$ marked on FIG. 2C define a cross-ratio. The value of the cross-ratio provides a length ratio in 3D space which may determine the distance Z between the planes 200 and 230 relative to the camera's distance $Z_c$ from the ground plane 200 as below:

$$\frac{d(p, c) \times d(p', v_3)}{d(p', c) \times d(p, v_3)} = \frac{d(P, C) \times d(P', V)}{d(P', C) \times d(P, V)}, \quad (1)$$

where d(x1, x2) is distance between two generic points x1 and x2. Since the back projection of the point V is a point at infinity, $$\frac{d(P', V)}{d(P, V)} = 1.$$

Also since d(P, C)=$Z_c$ and d(P', C)=$Z_c$-Z, simple algebraic manipulation on (1) yields $$\frac{Z}{Z_C} = 1 - \frac{d(p', c) \times d(p, v_3)}{d(p, c) \times d(p', v_3)}. \quad (2)$$

According to equation (2) above, the absolute distance Z may be obtained from this distance ratio once the camera's distance $Z_c$ is specified. Alternatively, $Z_c$ may be computed first based on a known reference distance, such as a known object dimension, and then the computed $Z_c$ may be applied to estimate a dimension of an object in the image.

Figure 3:
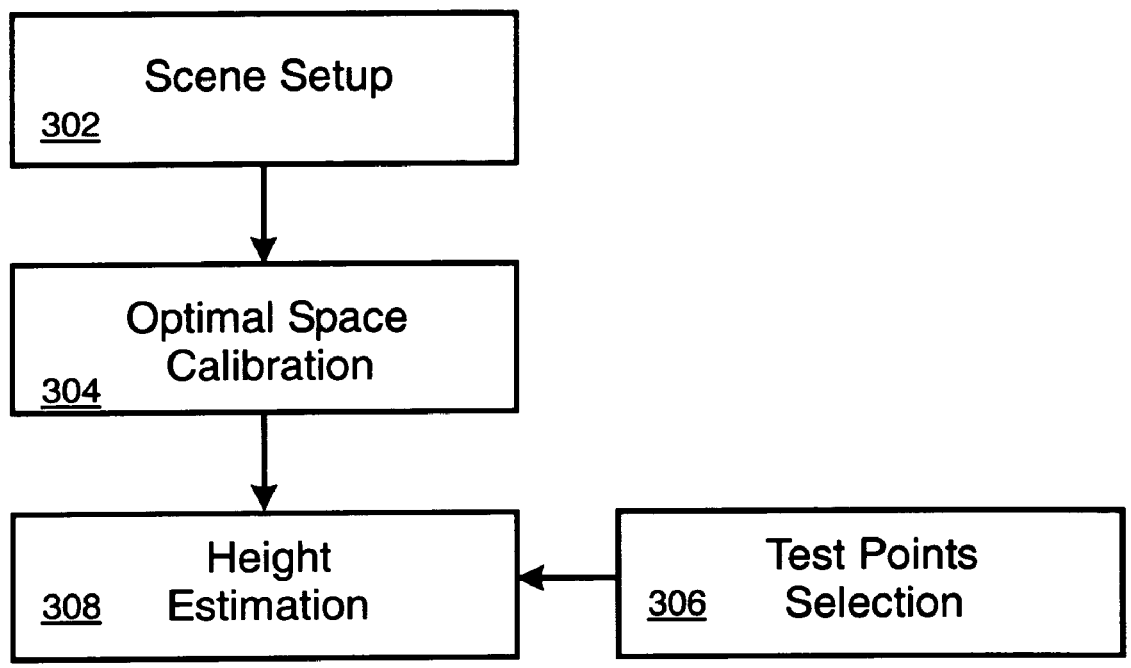
FIG. 3 illustrates an exemplary flow chart of a method for object dimension estimation in examples consistent with the present invention.
Figure 4:
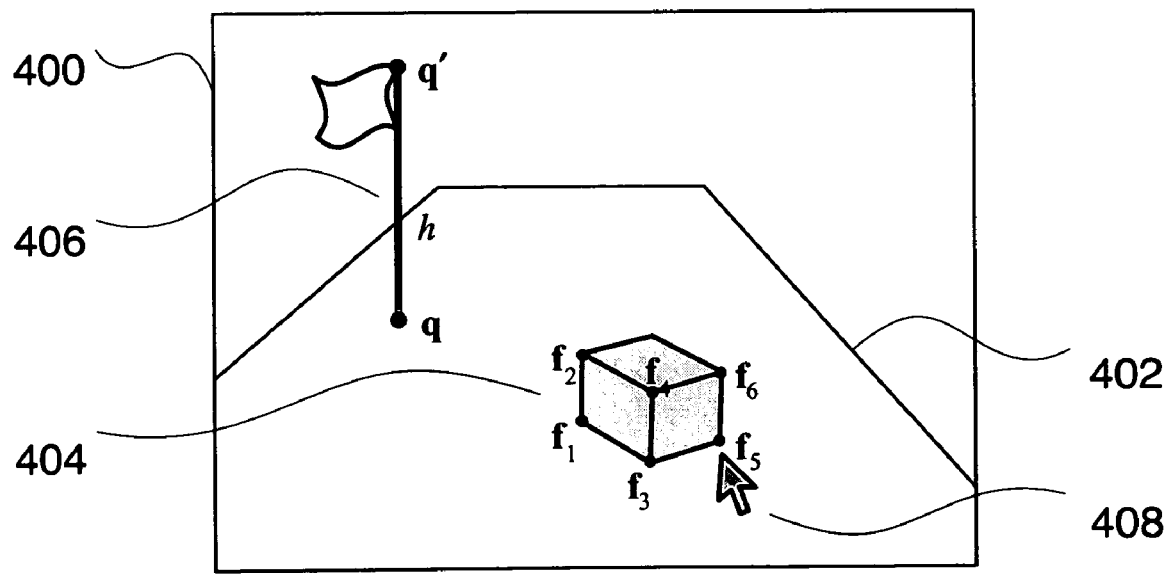
FIG. 4 is an exemplary illustration of a scene.

FIG. 3 illustrates an exemplary flow chart of an object measurement method in examples consistent with the present invention. As shown at FIG. 3, initial parameters are first set up at step 302. FIG. 4 illustrates an exemplary example of step 302. In an image 400, a reference cubic box 404 on the ground plane 402 provides a number of feature points $f_1$-$f_6$, wherein at least two planes are perpendicular to the reference plane in the 3D scene, for example the planes $\{f_1,f_2,f_3,f_4\}$ and $\{f_3,f_4,f_5,f_6\}$. Each plane may comprise at least two parallel lines to the reference plane in 3D scene, for example, the lines $\overline{f_1f_3}$ and $\overline{f_2f_4}$ in $\{f_1,f_2,f_3,f_4\}$ and the lines $\overline{f_3f_5}$ and $\overline{f_4f_6}$ in $\{f_3,f_4,f_5,f_6\}$. These feature points may provide at least two vertical lines to the reference plane in the 3D scene, for example, lines $\overline{f_1f_2}$ and $\overline{f_3f_4}$. The feature points $f_1$-$f_6$ are identified either by manually clicking via a mouse 408 on the image 400 or by computer automatic detection. In the case where the coordinates corresponding to the feature points $f_1$-$f_6$ and the reference object 406 are selected via the mouse 408, the image may be zoomed in prior first to increase the accuracy in selecting the coordinates provided to the object dimension estimation system. The extended lines of $\overline{f_1f_3}$ and $\overline{f_2f_4}$, $\overline{f_3f_5}$ and $\overline{f_4f_6}$, and $\overline{f_1f_2}$ and $\overline{f_3f_4}$ may result in three vanishing points. A vanishing line may be established by connecting the two vanishing points that are on the lines parallel to the ground plane 402. In the case where there are objects which height or dimensions are known, such as the reference cubic box 404 or the flag 406 shown at FIG. 4, the top and bottom coordinates q and q' of the objects 406, 404 and their actual dimensions may be provided to the object dimension estimation system of the present invention to complete the step 302.

Referring back to FIG. 3, step 304 performs an optimal space calibration to avoid errors in manual selection or automatic detection of point or coordinate position that may affect the computation of the vanishing points, and eventually, object dimension estimation. The coordinates corresponding to the feature points identified at step 302 are considered as initial parameters subject to adjustment. The object dimension estimation computed based on the initial parameters is evaluated using objective function by comparing to the actual dimension of the reference object.

Taking the cubic box 404 at FIG. 4 as an example. The cubic box 404 may provide the coordinates of six feature points $f_1$-$f_6$, collectively represented as $X=\{f_i|i=1, 2, \ldots 6\} \in \Re^2$. Since each feature point $f_i$ has coordinates as $(f_i^x, f_i^y)$, six feature points may provide twelve parameters. Based on the twelve parameters, three vanishing points may be computed based on lines $\overline{f_1f_3}$ and $\overline{f_2f_4}$, lines $\overline{f_3f_5}$ and $\overline{f_4f_6}$, and lines $\overline{f_1f_2}$ and $\overline{f_3f_4}$. The two vanishing points that are obtained from lines parallel to the reference planes may establish a vanishing line. Based on the vanishing line and the third vanishing point, the intersection point c as shown at FIG. 2C may be obtained. According to equation (2), the distance of the camera center 218 from the ground plane 200 may be computed as below:

$$Z_C = \frac{Z \times d(f_3, c) \times d(f_4, v_3)}{d(f_3, c) \times d(f_4, v_3) - d(f_4, c) \times d(f_3, v_3)}. \quad (3)$$

Assuming that the number of reference objects with their height known is N, collectively represented as $S=\{(q_j, q_j', h_j) | j=1, 2, \ldots N\}$, the objective function of X is:

$$\min \quad F(X) = \frac{1}{N} \sum_{j=1}^{N} |h_j - Z_j|, \quad (4)$$

where $Z_j$ is the height of $j^{th}$ reference object computed based on the following equation:

$$Z_j = Z_C \times \left(1 - \frac{d(q_j', c) \times d(q_f, v_3)}{d(q_j, c) \times d(q_j', v_3)}\right), j = 1, 2, \ldots N. \quad (5)$$

In order to search for an optimal parameter set for $X=\{f_i|i=1, 2, \ldots 6\} \in \Re^2$, the $k^{th}$ parameter $f_k$ is set between the range of $[f_k^0 - \delta_k, f_k^0 + \delta_k]$, where $\delta_k$ is the search space and k=1, 2, 3, . . . 12. With computer simulation, such as genetic algorithm, simulated annealing, tabu search or particle swarm optimization, a population of abstract representations of candidate parameters evolves toward a better parameter set so that the estimated dimension of the reference object would be close to its actual dimension. D. E. Goldberg, *Genetic Algorithms in Search Optimization and Machine Learning*, Addison-Wesley, Reading Mass., 1989, D. T. Pham and D. Karaboga, *Intelligent Optimisation Techniques Genetic Algorithms, Tabu Search, Simulated Annealing and Neural Networks*. New York: Springer-Verlag, 2000, and M. Clerc, *Particle Swarm Optimization*. Hermes Science Pubns, 2006, are incorporated herein with respect to the genetic algorithm, simulated annealing, tabu search and particle swarm optimization.

Referring back to FIG. 3, after optimal space calibration of step 304, object dimension estimation on any object in the same image may be estimated provided that the top and bottom coordinates corresponding to the particular object in the image are given. At step 306, the coordinates corresponding to the object to be measured are provided to the system either via user input devices or automatic detection of the coordinates of the selected object. At step 308, the object dimension may be obtained in accordance with equation (2) above.

Figure 5:
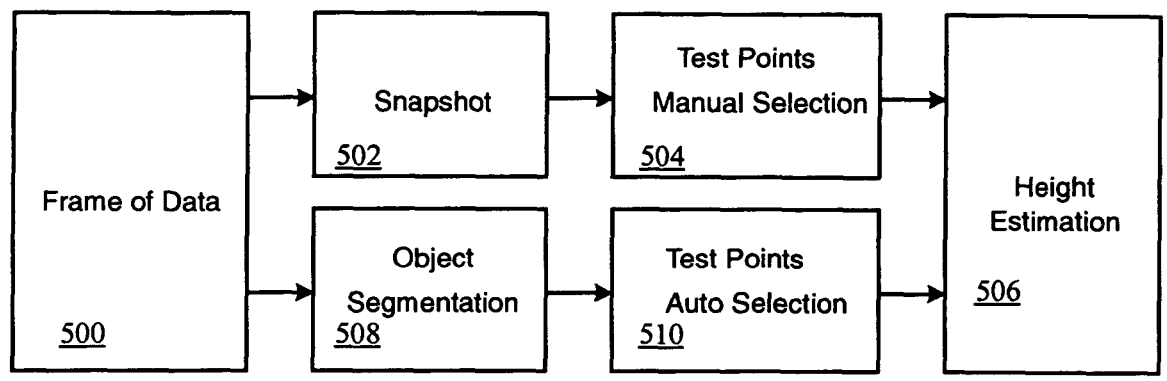
FIG. 5 is an exemplary block diagram for illustrating an image processing technique consistent with the present invention.

FIG. 5 illustrates an exemplary example of steps 306 and 308. A series of frames of video data 500 may be first captured by a snapshot 502 to obtain a particular image. Once the image is obtained, a user may select via a mouse or keyboard the top and bottom points of an object to be measured at 504. Then the object dimension estimation may be obtained based on equation (2) above. Alternatively, object segmentation technology 508 may be relied on to detect the area that the object to be measured is located, thereby acquiring the top and bottom coordinates of the area by computer analysis.

Figure 6:
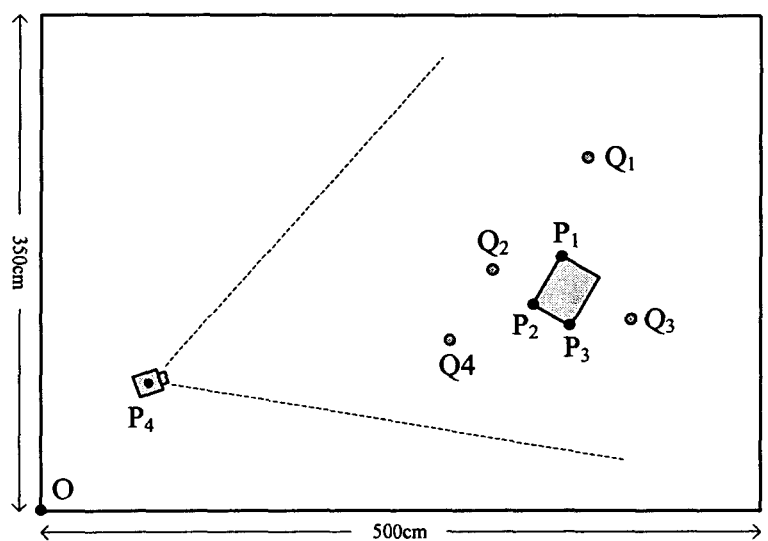
FIG. 6 is an illustration of a scene used for applying the object dimension estimation method in examples consistent with the invention.
Figure 7:
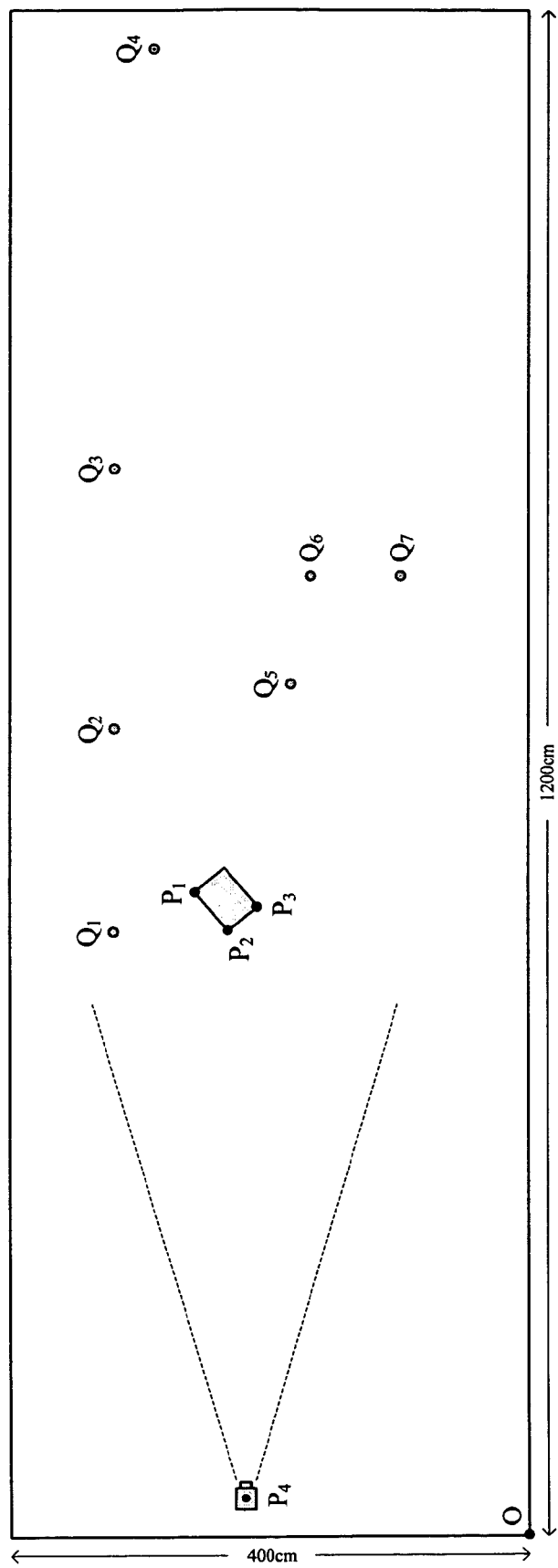
FIG. 7 is an illustration of a scene used for applying the object dimension estimation method in examples consistent with the present invention.

FIGS. 6 and 7 are illustrations of a exemplary scene used for applying the object dimension estimation method in examples consistent with the invention. In this example, the experiments are conducted using a Logitech QuickCam Sphere digital video camera and a CCD Pulis P2650 video camera with image capture card Winnov Videum 1000+. The image resolution for both cameras is 640×480 pixels. Genetic algorithm is applied for optimal space calibration. The search space is set to $\delta_k=5$. The number of generations to iterate the algorithm is set to 5000. The size of population $N_{pop}$ is 20. The selection operation $P_s$ is set to 0.2, crossover $P_c$ is 0.8, and the mutation rate $P_m$ is set to 0.1. A cubic box with its dimension of 275 mm is used as a reference box.

In the first experiment, the digital video camera $P_4$ captures a scene as shown at FIG. 6. The actual height of the camera is 800 mm. The cubic box may provide six feature points, and three of the feature points P1, P2 and P3 are identified in FIG. 6 taken from a vertical view. Assuming the coordinate of point O is (0, 0), the coordinates of each point on the image are $P_1(365, 175), P_2(345, 140), P_3(370, 125), P_4(75, 90), Q_1(380, 250), Q_2(315, 170), Q_3(410, 135), Q_4(285, 120)$. Table 1 below shows the result of object dimension estimation based on the optimal coordinates of the feature points.

TABLE 1

|  | $Q_1$ | $Q_2$ | $Q_3$ | $Q_4$ |
| --- | --- | --- | --- | --- |
| Actual height (mm) | 300 | 300 | 300 | 300 |
| Pixel numbers (pixel) | 83 | 109 | 88 | 129 |
| Conversion ratio (mm/pixel) | 3.61 | 2.75 | 3.41 | 2.33 |
| Estimated height (mm) | 305.21 | 308.60 | 302.42 | 308.67 |
| Error rate (%) | 1.74 | 2.87 | 0.81 | 2.89 | where pixel number means the number of pixels that the reference object occupies on the image, conversion ratio is (actual height/pixel numbers), and error rate is (|estimated height−actual height|/actual height).

In the second experiment, the CCD camera $P_4$ may be used to capture a scene similar to what is shown in FIG. 7. The actual height of the camera is 2650 mm in this example. Assuming the coordinate of point O is (0, 0), the coordinates of each point on the image are $P_1(505, 260), P_2(475, 230), P_3(495, 210), P_4(30, 220), Q_1(475, 320), Q_2(635, 320), Q_3(840, 320), Q_4(1170, 290), Q_5(670, 185), Q_6(755, 170), Q_5(755, 100)$ Table 2 below shows the result of object dimension estimation based on the optimal coordinates of the feature points.

TABLE 2

|  | $Q_1$ | $Q_2$ | $Q_3$ | $Q_4$ | $Q_5$ | $Q_6$ | $Q_7$ |
|---|---|---|---|---|---|---|---|
| Actual height (mm) | 750 | 750 | 750 | 750 | 250 | 750 | 750 |
| Pixel numbers (pixel) | 111 | 86 | 70 | 58 | 30 | 81 | 81 |
| Conversion ratio (mm/pixel) | 6.76 | 8.72 | 10.71 | 12.93 | 8.33 | 9.26 | 9.26 |
| Estimated height (mm) |  | 750.08 | 750.34 | 743.52 | 754.92 | 257.86 | 759.71 | 751.03 |
| Error rate (%) |  | 0.01 | 0.05 | 0.86 | 0.66 | 3.14 | 1.29 | 0.14 |

According to Table 1 and Table 2 above, the present invention may provide dimension estimation of an object from an image with high degree of precision.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

I claim:

1. A method of obtaining a dimension of a target object in an image, comprising:
   receiving coordinates of a number of feature points in the image;
   receiving coordinates of at least one reference object in the image each with a known dimension;
   performing a calibration to increase an accuracy in determining the dimension of the at least one reference object by adjusting the coordinates of at least one of the feature points based on a determined dimension and the known dimension of the at least one reference object, wherein the determined dimension is obtained based on coordinates of the feature points and coordinates of the at least one reference object; and
   receiving coordinates of the target object in the image and determining the dimension of the target object based on the coordinates of the number of feature points after the calibration,
   wherein the method is performed by execution of computer-readable program code by a processor of a computer.

2. The method of claim 1, wherein the calibration is performed by optimization algorithms.

3. The method of claim 2, wherein the optimization algorithms include at least one of genetic algorithms, simulated annealing, tabu search or particle swarm optimization.

4. The method of claim 1 further comprising determining coordinates of vanishing points based on the coordinates of the feature points.

5. The method of claim 4, wherein determining the dimension of the at least one reference object comprises determining the dimension of the at least one reference object based on the vanishing points.

6. The method of claim 4, wherein receiving coordinates of the target object in the image and determining the dimension of the target object comprises receiving coordinates of the target object in the image and determining the dimension of the target object based on the vanishing points.

7. The method of claim 1, wherein the coordinates of the feature points received based on a user selection of corresponding points in the image.

8. A method of claim 1, wherein the coordinates of the feature points received based on automatic detection.

9. The method of claim 1 further comprising:
   determining coordinates corresponding to vanishing points based on the coordinates of the feature points
   wherein determining a dimension of at least one reference object comprises determining a dimension of at least one reference object based on the coordinates corresponding to the vanishing points,
   wherein performing a calibration comprises performing a calibration to adjust the coordinates of at least one of the feature points, and thereby adjust the coordinates corresponding to the vanishing points, and
   wherein determining the dimension of the target object comprises determining the dimension of the target object based on the adjusted coordinates corresponding to the vanishing points.

10. A system for obtaining a dimension of a target object in an image, comprising:
    a first device configured to provide coordinates corresponding to a number of feature points in the image and provide coordinates corresponding to at least one reference object in the image each with a known dimension;
    a calibration device configured to increase an accuracy in determining the dimension of the at least one reference object by adjusting the coordinates of at least one of the feature points based on a determined dimension and the known dimension of the at least one reference object, wherein the determined dimension is obtained based on coordinates of the feature points and coordinates of the at least one reference object; and
    a second device configured to receive coordinates of the target object in the image and determine the dimension of the target object based on the coordinates of the feature points after the calibration.

11. The system of claim 10, wherein the first device is an user input device.

12. The system of claim 10, wherein the first device is an automatic detection device.

13. The system of claim 10, wherein the calibration device is configured to perform optimization algorithms.

14. The system of claim 13, wherein the optimization algorithms include at least one of one of genetic algorithms, simulated annealing, tabu search or particle swarm optimization.

15. The system of claim 10 further comprising a second device configured to receive the coordinates corresponding to the feature points and generate coordinates of vanishing points.

16. An apparatus comprising a processor configured to at least perform or cause the apparatus to at least perform the following:
    receiving coordinates of a number of feature points in the image;
    receiving coordinates of at least one reference object in the image each with a known dimension;

performing a calibration to increase an accuracy in determining the dimension of the at least one reference object by adjusting the coordinates of at least one of the feature points based on a determined dimension and the known dimension of the at least one reference object, wherein the determined dimension is obtained based on coordinates of the feature points and coordinates of the at least one reference object; and receiving coordinates of the target object in the image and determining the dimension of the target object based on the coordinates of the feature points after the calibration.

17. The apparatus of claim 16, wherein the calibration is performed by optimization algorithms, the optimization algorithms including at least one of genetic algorithms, simulated annealing, tabu search or particle swarm optimization.

18. The apparatus of claim 16, wherein the processor is further configured to at least perform or cause the apparatus to further perform the following:

determining coordinates of vanishing points based on the coordinates of the feature points, wherein determining the dimension of the at least one reference object comprises determining the dimension of the at least one reference object based on the vanishing points.

19. The apparatus of claim 18, wherein receiving coordinates of the target object in the image and determining the dimension of the target object comprises receiving coordinates of the target object in the image and determining the dimension of the target object based on the vanishing points.

20. The apparatus of claim 16, wherein the coordinates of the feature points are received based on a user selection of corresponding points in the image, or based on automatic detection.

21. The apparatus of claim 16, wherein the processor is further configured to at least perform or cause the apparatus to further perform the following:

determining coordinates corresponding to vanishing points based on the coordinates of the feature points, wherein determining a dimension of at least one reference object comprises determining a dimension of at least one reference object based on the coordinates corresponding to the vanishing points, wherein performing a calibration comprises performing a calibration to adjust the coordinates of at least one of the feature points and thereby adjust the coordinates corresponding to the vanishing points, and wherein determining the dimension of the target object comprises determining the dimension of the target object based on the adjusted coordinates corresponding to the vanishing points.

* * * * *

UNITED STATES PATENT AND TRADEMARK OFFICE
CERTIFICATE OF CORRECTION

| | | |
|---|---|---|
| PATENT NO. | : 7,853,038 B2 | Page 1 of 1 |
| APPLICATION NO. | : 11/649940 | |
| DATED | : December 14, 2010 | |
| INVENTOR(S) | : Lee | |

It is certified that error appears in the above-identified patent and that said Letters Patent is hereby corrected as shown below:

Column 7,

Lines 64 and 67, "points received" should read --points are received--.

Signed and Sealed this
Seventh Day of June, 2011

David J. Kappos
*Director of the United States Patent and Trademark Office*